United States Patent
Wang et al.

(10) Patent No.: US 11,500,225 B2
(45) Date of Patent: Nov. 15, 2022

(54) EYEGLASS AND METHOD FOR ADJUSTING INCIDENT LIGHT INTO EYES

(71) Applicants: Fuzhou BOE Optoelectronics Technology Co., Ltd., Fujian (CN); BOE Technology Group Co., Ltd., Beijing (CN)

(72) Inventors: Yang Wang, Beijing (CN); Liangliang Li, Beijing (CN); Zheng Liu, Beijing (CN)

(73) Assignees: FUZHOU BOE OPTOELECTRONICS TECHNOLOGY CO., LTD., Fujian (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 232 days.

(21) Appl. No.: 16/768,388

(22) PCT Filed: Dec. 25, 2019

(86) PCT No.: PCT/CN2019/128243
§ 371 (c)(1),
(2) Date: May 29, 2020

(87) PCT Pub. No.: WO2020/140802
PCT Pub. Date: Jul. 9, 2020

(65) Prior Publication Data
US 2021/0247606 A1    Aug. 12, 2021

(30) Foreign Application Priority Data
Jan. 2, 2019   (CN) .......................... 201910002694.5

(51) Int. Cl.
*G02B 27/00*  (2006.01)
*G02C 7/08*   (2006.01)
(Continued)

(52) U.S. Cl.
CPC .......... *G02C 7/085* (2013.01); *G02B 27/0093* (2013.01); *G02C 7/061* (2013.01); *G02C 11/10* (2013.01); *G02C 2202/24* (2013.01)

(58) Field of Classification Search
CPC .... G02B 27/0093; G02B 3/14; G02B 26/005; G02C 7/061; G02C 7/085; G02C 11/10;
(Continued)

(56) References Cited

U.S. PATENT DOCUMENTS

| 4,300,818 A | 11/1981 | Schachar |
| 2006/0170864 A1* | 8/2006 | Kuiper ................. G02B 26/005 351/205 |

(Continued)

FOREIGN PATENT DOCUMENTS

| CN | 1243967 A | 2/2000 |
| CN | 2704861 Y | 6/2005 |

(Continued)

OTHER PUBLICATIONS

First Office Action with Search Report dated Oct. 14, 2019 corresponding to Chinese application No. 201910002694.5.
"Optical Manual"; Sep. 9, 2019.

*Primary Examiner* — Darryl J Collins
*Assistant Examiner* — Matthew Y Lee
(74) *Attorney, Agent, or Firm* — Nath, Goldberg & Meyer; Joshua B. Goldberg

(57) ABSTRACT

The present disclosure relates to eyeglass and a method for adjusting incident light into eyes. The eyeglass include: a crystalline lens condition acquisition member configured to acquire a condition of a crystalline lens of a user who wears the eyeglass; a lens of eyeglass including an electrowetting dual-liquid zoom lens assembly, the electrowetting dual-liquid zoom lens assembly including insulating liquid and conductive liquid which are encapsulated and driving electrodes configured to apply a voltage to the insulating liquid (Continued)

and the conductive liquid; and a driving device coupled to the crystalline lens condition acquisition member and the driving electrodes and configured to adjust the voltage of the driving electrodes in the case where the crystalline lens is in a tightened condition so as to convert light transmitted through the eyeglass to parallel light.

15 Claims, 5 Drawing Sheets

(51) Int. Cl.
 *G02C 7/06* (2006.01)
 *G02C 11/00* (2006.01)
(58) Field of Classification Search
 CPC .... G02C 2202/24; G02C 7/027; G02C 7/022; G02C 7/024; G02C 7/06
 USPC ..................................................... 351/159.4
 See application file for complete search history.

(56) References Cited

U.S. PATENT DOCUMENTS

| | | | |
|---|---|---|---|
| 2006/0244902 A1* | 11/2006 | Kuiper | ..................... G02B 3/14 351/159.41 |
| 2016/0193104 A1* | 7/2016 | Du | .......................... A61B 3/12 351/203 |

FOREIGN PATENT DOCUMENTS

| | | |
|---|---|---|
| CN | 201194052 Y | 2/2009 |
| CN | 206115057 U | 4/2017 |
| CN | 106646916 A | 5/2017 |
| CN | 106821697 A | 6/2017 |
| CN | 106980185 A | 7/2017 |
| CN | 107037592 A | 8/2017 |
| CN | 107280926 A | 10/2017 |
| CN | 107789168 A | 3/2018 |
| CN | 109031651 A | 12/2018 |
| CN | 109445128 A | 3/2019 |
| WO | 02096345 A1 | 12/2002 |

* cited by examiner

500

Acquiring a condition of a crystalline lens of the eye    501

Converting incident light of the eye to parallel light by an electrowetting dual-liquid zoom lens assembly in the case where the crystalline lens is in a tightened condition    502

EYEGLASS AND METHOD FOR ADJUSTING INCIDENT LIGHT INTO EYES

CROSS-REFERENCE TO RELATED APPLICATION

This is a National Phase Application filed under 35 U.S.C. 371 as a national stage of PCT/CN2019/128243, filed on Dec. 25, 2019, an application claiming the benefit of priority to Chinese Patent Application No. 201910002694.5 filed on Jan. 2, 2019, the contents of each of which are incorporated herein in their entirety by reference.

TECHNICAL FIELD

The present disclosure relates to a wearable device, and in particular, to an eyeglass and a method for adjusting incident light into an eye.

BACKGROUND

Myopia has a high incidence, which is about 62% in China according to statistics of medical institutions. Moreover, myopia is irreversible after the onset, and is usually treated by wearing eyeglass to correct vision or treated by laser surgery. Although people know that watching nearby objects fora long time may cause myopia and also know that they need to take a break to look far into the distance to relax, but they may not relax their ciliary muscles freely due to limitations of working environment (for example, a large amount of work needs to be done by watching a nearby computer screen for a long time, or there is no time to look far into the distance when focusing full attention on work). At present, there is alack of effective and convenient prevention means and devices.

SUMMARY

According to a first aspect, an eyeglass is provided in an embodiment of the disclosure. The eyeglass includes: a crystalline lens condition acquisition member configured to acquire a condition of a crystalline lens of an eye of a user who wears the eyeglass; a lens of eyeglass comprising an electrowetting dual-liquid zoom lens assembly, the electrowetting dual-liquid zoom lens assembly comprising insulating liquid, conductive liquid and driving electrodes, with the insulating liquid and conductive liquid being encapsulated, and the driving electrodes being configured to apply a voltage to the insulating liquid and the conductive liquid; and a driving device coupled to the crystalline lens condition acquisition member and the driving electrodes, and configured to adjust the voltage applied by the driving electrodes in response to that the crystalline lens is in a tightened condition so as to convert light transmitted through the eyeglass to parallel light.

In some embodiments of the disclosure, the driving device is configured to determine a duration of an acquired condition of the crystalline lens, and adjust the voltage of the driving electrodes according to both the acquired condition of the crystalline lens and the duration of the acquired condition.

In some embodiments of the disclosure, the crystalline lens condition acquisition member comprises a light emitter configured to emit a light beam to the crystalline lens of the eye of the user who wears the eyeglass, and an image sensor configured to acquire an image formed by a light beam returned from the crystalline lens of the eye of the user, and the driving device comprises a driving chip configured to receive the image formed by the image sensor, calculate a diopter of the crystalline lens according to the image, and adjust the voltage of the driving electrodes according to the diopter of the crystalline lens.

In some embodiments of the disclosure, adjusting the voltage of the driving electrodes according to the diopter of the crystalline lens comprises: adjusting the voltage of the driving electrodes in response to that the diopter of the crystalline lens is greater than a first threshold, so as to turn the electrowetting dual-liquid zoom lens assembly into a convex lens.

In some embodiments of the disclosure, the crystalline lens condition acquisition member is configured to continuously acquire the condition of the crystalline lens of the eye of the user who wears the eyeglass, and adjusting the voltage of the driving electrodes according to the diopter of the crystalline lens further comprises: stopping adjusting the voltage of the driving electrodes in response to that a fluctuation in the diopter of the crystalline lens is less than a second threshold.

In some embodiments of the disclosure, the light emitter and the image sensor are on a side of the eyeglass proximal to the eye.

In some embodiments of the disclosure, the light emitter is an infrared emitter, and the crystalline lens condition acquisition member further includes an infrared filter on a light incoming side of the image sensor.

In some embodiments of the disclosure, the crystalline lens condition acquisition member includes a distance sensor configured to measure a distance between the eyeglass and a target object, and the driving device includes a driving chip configured to adjust the voltage of the driving electrodes according to a measured distance.

In some embodiments of the disclosure, the driving chip is further configured to apply no voltage to the driving electrodes in response to that the measured distance is greater than a distance threshold.

In some embodiments of the disclosure, the electrowetting dual-liquid zoom lens assembly further includes: a substrate on which a grid array of accommodation units is locate, each of the accommodation units being configured to accommodate the conductive liquid and the insulating liquid therein, and a top layer configured to cover and encapsulate the conductive liquid and the insulating liquid in all of the accommodation units.

In some embodiments of the disclosure, at least inner side walls of each of the accommodation unit are coated with a hydrophobic layer.

In some embodiments of the disclosure, the substrate, the insulating liquid, and the conductive liquid are arranged in sequence along a light incident direction.

According to a second aspect, a method for adjusting incident light into an eye is provided. The method includes: acquiring a condition of a crystalline lens of the eye; and converting incident light into the crystalline lens of the eye to parallel light by an electrowetting dual-liquid zoom lens assembly in response to that the crystalline lens is in a tightened condition, the electrowetting dual-liquid zoom lens assembly comprising insulating liquid, conductive liquid and driving electrodes, with the insulating liquid, conductive liquid being encapsulated and the driving electrodes being configured to apply a voltage to the insulating liquid and the conductive liquid.

In some embodiments of the disclosure, the method further includes: determining a duration of an acquired condition of the crystalline lens; and converting the incident light into the crystalline lens of the eye to parallel light by the electrowetting dual-liquid zoom lens assembly in response to that the crystalline lens is in a tightened condition and the duration of the tightened condition exceeds a third threshold.

In some embodiments of the disclosure, acquiring the condition of the crystalline lens of the eye comprises: emitting a light beam to the crystalline lens of the eye, and acquiring an image formed by a light beam returned from the crystalline lens of the eye; and converting the incident light into the crystalline lens of the eye to parallel light by the electrowetting dual-liquid zoom lens assembly in response to that the crystalline lens is in the tightened condition comprises: calculating a diopter of the crystalline lens according to the image, and adjusting the voltage of the driving electrodes in response to that the diopter of the crystalline lens is greater than a first threshold, so as to turn the electrowetting dual-liquid zoom lens assembly into a convex lens.

In some embodiments of the disclosure, the step of acquiring the condition of the crystalline lens of the eye is performed continuously, and adjustment of the voltage of the driving electrodes stops in response to that a fluctuation in the diopter of the crystalline lens is less than a second threshold.

In some embodiments of the disclosure, the condition of the crystalline lens of the eye is acquired by measuring a distance between the eye and a target object.

BRIEF DESCRIPTION OF THE DRAWINGS

To illustrate the technical solutions of the embodiments of the present disclosure more clearly, the drawings of the embodiments will be briefly discussed below, and it is apparent that the drawings described below only illustrate some embodiments of the present disclosure but do not limit the present disclosure.

FIG. 1 (*b*) is a schematic diagram showing an eye viewing a nearby object with an unadjusted crystalline lens;

FIG. 1 (*c*) is a schematic diagram showing an eye viewing a nearby object with an adjusted crystalline lens;

FIG. 1 (*d*) is a schematic diagram illustrating a principle of cause of myopia;

FIG. 3 (*b*) is a cross-sectional view of eyeglass in which an electrowetting dual-liquid zoom lens assembly thereof is a convex lens according to an embodiment of the present disclosure;

DETAILED DESCRIPTION

Figure 1:
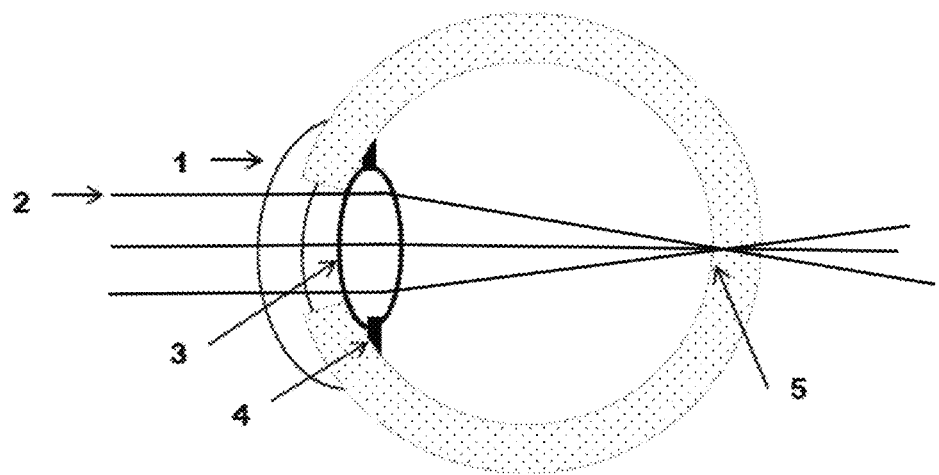
FIG. 1 (*a*) is a schematic diagram showing an eye viewing a distant object.
Figure 1:
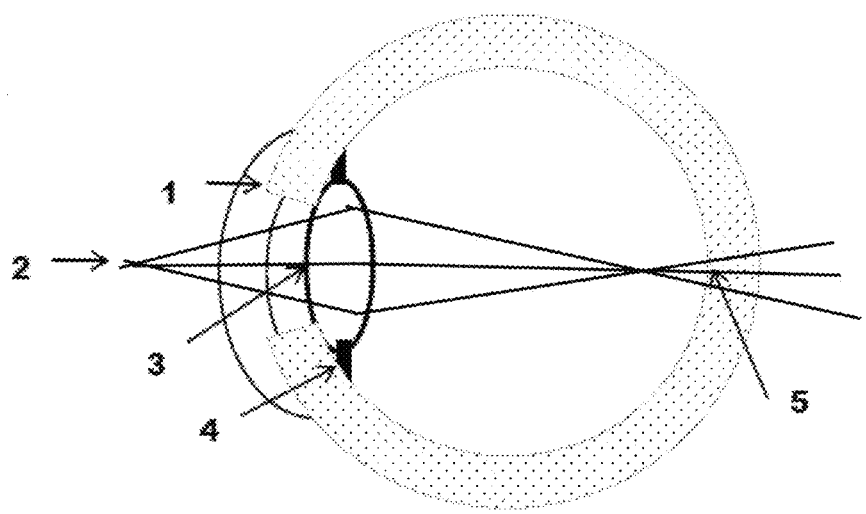
Figure 1:
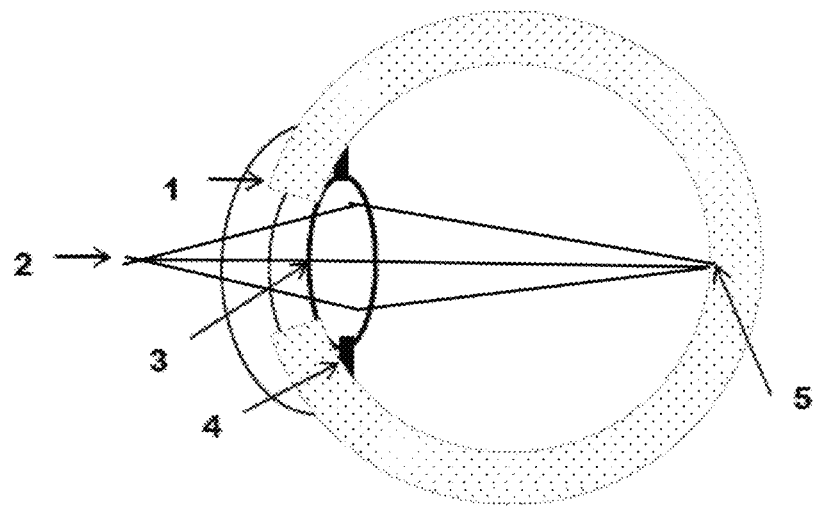
Figure 1:
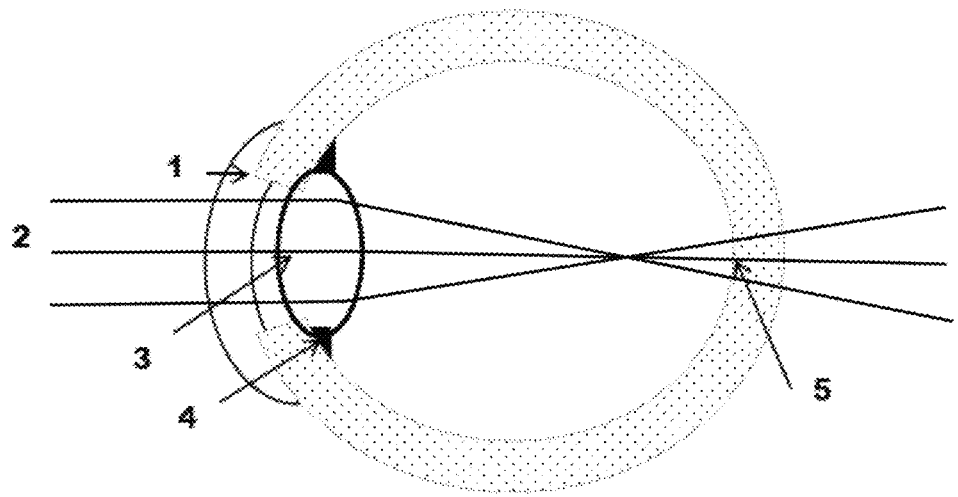

In order to make the objectives, technical solutions and advantages of the embodiments of the present disclosure clearer, the technical solutions of the embodiments of the present disclosure will be described clearly and completely below with reference to the drawings of the embodiments of the present disclosure. It is apparent that the embodiments described herein are some of the embodiments of the present disclosure, but not all of the embodiments. All other embodiments, which are obtained by those skilled in the art based on the described embodiments of the present disclosure without inventive work, are within the protection scope of the present disclosure.

Unless otherwise defined, technical terms or scientific terms used in the present disclosure should have general meanings that can be understood by people with ordinary skills in the technical field of the present disclosure. The word "include" or "comprise" and the like indicate that an element or object before the word covers elements or objects or the equivalents thereof listed after the word, but do not exclude other elements or objects. The word "connect" or "couple" and the like are not restricted to physical or mechanical connection, but may include electrical connection, whether direct or indirect. The words "on", "under", "left", "right" and the like are used merely to indicate relative positional relationships, and when an absolute position of an object described is changed, the relative positional relationships may also be changed accordingly. The expression "acquiring a condition/status of a crystalline lens of the eye" in the present disclosure is intended to mean acquiring a related condition/status of the crystalline lens of the eye, for example, the acquired condition maybe a condition that whether the crystalline lens is tightened, or a condition related to whether the crystalline lens is tightened, such as a condition that a target object, which causes the crystalline lens to tighten, is nearby, a condition that a target object, which causes the crystalline lens to relax, is far away, or a condition that the ciliary muscle relaxes or tightens (e.g. electromyographic signals of the ciliary muscle), etc. Accordingly, "a crystalline lens condition acquisition member configured to acquire a condition of a crystalline lens of the eye" in the present disclosure is intended to indicate a member capable of acquiring the various related conditions described above.

The applicant found that there is a need for portable eyeglass and a corresponding method for automatically adjusting incident light into the eye, which may automatically monitor conditions of the crystalline lens of the eye, and accordingly adjust a focal length of a zoom lens assembly in real time and in a precise way to convert the light transmitted through the eyeglass and the incident light into the eyes to parallel light, so as to fully relax the ciliary muscle of the eye, thereby realizing effective prevention of myopia.

Eyeglass and a method for adjusting incident light into an eye according to the embodiments of the present disclosure may make the crystalline lens and ciliary muscle of the user's eyes get proper tightening exercise, and at the same time prevent from fatigue of the crystalline lens and ciliary muscle, which is beneficial to the health of eyes and prevention of myopia. Firstly, the cause of myopia is first described. When a human eye views a distant object, ambient light 2 emitted into the human eye from the outside is approximately parallel light, as shown in FIG. 1 (*a*), the approximately parallel light is transmitted through a cornea 1 and the crystalline lens 3, and projected right on a retina 5, so that the object can be seen clearly. However, when the human eye views a nearby object, the ambient light 2 emitted into the human eye from the outside is generally approximately curved light. When the crystalline lens 3 has not been adjusted by the ciliary muscle 4, as shown in FIG. 1 (*b*), the ambient light 2 from the outside cannot be projected on the retina 5 via the cornea 1 and the crystalline lens 3 which has not been adjusted yet, in this case the nearby object cannot be seen clearly. Since the crystalline lens 3 of the eye can be compressed with ciliary muscle 4 to tighten it and change its thickness as shown in FIG. 1 (*c*), the ambient light 2 from the outside is projected on the retina 5 via the cornea 1 and the crystalline lens 3 which has been adjusted well, in this case the nearby object can be seen clearly. When viewing a nearby object, such as a computer, a newspaper, or a book, for a long time, the ciliary muscle 4 is kept in a tightened up state to continuously press and tighten the crystalline lens 3, and thus the ciliary muscle 4 is likely to go into spasm, and the long-time continuous pressing on the eyeball (especially the crystalline lens 3) may cause the crystalline lens 3 to become thicker and an axis of the eye to become longer gradually. After the axis of the eye becomes longer, the ambient light 2 from the outside cannot be focused on the retina 5 via the cornea 1 and the crystalline lens 3 which has been adjusted for the distant objects, thereby resulting in myopia, as shown in FIG. 1 (*d*).

Figure 2:
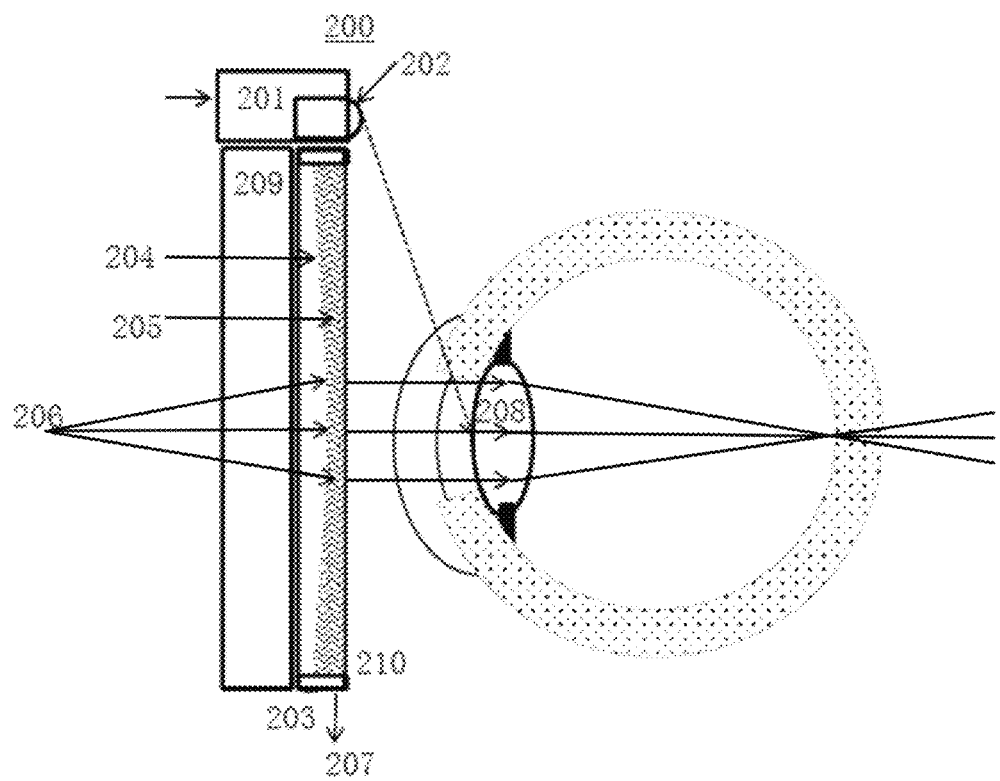
FIG. 2 is a schematic structural diagram of eyeglass when being worn on eyes according to an embodiment of the present disclosure.

FIG. 2 is a schematic structural diagram of eyeglass 200 when being worn on eyes according to an embodiment of the present disclosure. As shown in FIG. 2, the eyeglass include: a crystalline lens condition acquisition member 202 configured to acquire a condition of a crystalline lens 208 of a user who wears the eyeglass 200; a lens of eyeglass 203 including an electrowetting dual-liquid zoom lens assembly 210, which includes insulating liquid 204, conductive liquid 205, and driving electrodes 207, with the insulating liquid 204, conductive liquid 205 being encapsulated, and the driving electrodes 207 being configured to apply a voltage to the conductive liquid 205 and the insulating liquid 204; and a driving device 201, which is coupled to the crystalline lens condition acquisition member 202 and the driving electrodes 207 and configured to adjust the voltage of the driving electrodes 207 according to an acquired condition of the crystalline lens 208, so that incident ambient light 206 is converted to parallel light after passing through the eyeglass 200 under the condition that the crystalline lens 208 and the ciliary muscle are tired (in this case where the crystalline lens is in a tightened condition). In some embodiments, the electrowetting dual-liquid zoom lens assembly 210 may include a substrate 209 for carrying the insulating liquid 204 and the conductive liquid 205.

In some embodiments, the driving device 201 may include a driving chip, so as to be mounted on the eyeglass 200 more conveniently. In some embodiments, in addition to the driving chip, the driving device 201 may further include a flexible circuit board and a battery.

A principle of the electrowetting dual-liquid zoom lens assembly 210 is that the electrowetting dual-liquid zoom lens assembly 210 has the transparent insulating liquid 204 and conductive liquid 205, which have the same density but are immiscible. When a voltage is applied to the conductive liquid 205 and the insulating liquid 204, a polarity of the insulating liquid 204 may be adjusted by changing the applied voltage, so as to control the interfacial tension between the insulating liquid 204 and the conductive liquid 205 to in turn change an interface of the conductive liquid 205 in the electrowetting dual-liquid zoom lens assembly 210, so that the electrowetting dual-liquid zoom lens assembly 210 becomes a concave lens, a plane lens, and a convex lens correspondingly to diverge, transmit, and converge incident ambient light respectively.

The main cause of myopia is viewing a nearby object for a long time, the ambient light 2 reflected from or emitted by the nearby object is curved light, as shown in FIG. 1 (*c*), the ciliary muscle 4 is kept in a tightened up state to continuously press and tighten the crystalline lens 3 and thus is likely to go into spasm, and the crystalline lens 3 becomes thicker and the axis of the eye becomes longer gradually after the eyeball (especially the crystalline lens 3) is continuously pressed for a longtime. In view of that, the crystalline lens condition acquisition member 202 can acquire the conditions of the crystalline lens 208, such as a condition that the crystalline lens 208 will adopt a relatively large diopter (a natural reaction of eyes for continuously viewing a nearby object) or is adopting a relatively large diopter (which may be obtained by measurement and estimation), and a condition that the ciliary muscle is continuously tense to tighten the crystalline lens 208 (which may be measured by an electromyography acquisition electrode). Based on the acquired condition that the crystalline lens 208 is continuously tightened, the driving device 201 may adjust the voltage of the driving electrodes 207 to turn the electrowetting dual-liquid zoom lens assembly 210 into a convex lens, so as to appropriately converge the curved light to parallel light which is then emitted from the eyeglass 200 into the eye, as shown in FIG. 2. By converging the incident light to parallel light, the ciliary muscle and the crystalline lens 208 can be relaxed, thereby preventing myopia effectively.

Furthermore, in the cases where the ambient light entering the eyeglass 200 is parallel light, for example, in the case of viewing a distant object, the ciliary muscle and the crystalline lens 208 relax, therefore the driving device 201 may adjust the voltage of the driving electrodes 207 to turn the electrowetting dual-liquid zoom lens assembly 210 into a plane lens for maintaining the parallel light state of the incident light into the eye, therefore the user can view the distant object freely and clearly.

In some embodiments, the driving device 201 is configured to determine a duration of an acquired condition of the crystalline lens, for example, driving device 201 (e.g. a driving chip) may include a clock for determining a duration of an acquired condition of the crystalline lens 208 (e.g. in a tightened condition). The driving device 201 is configured to adjust the voltage of the driving electrodes 207 according to both of the acquired condition of the crystalline lens 208 and the duration of the acquired condition. For example, when a duration of a tightened condition of the crystalline lens 208 exceeds a third threshold, it may be determined that the crystalline lens 208 and the ciliary muscle of the eye are already tired. By adjusting the voltage of the driving electrodes 207 to convert the light transmitted through the eyeglass 200 to parallel light, the tense crystalline lens 208 and ciliary muscle can be relaxed. Whereas, in a case where the duration of the tightened condition of the crystalline lens 208 does not exceed the threshold, it may be determined that the crystalline lens 208 is tightened within a suitable application range and thus does not need relax, so that the crystalline lens 208 and the ciliary muscle of the user's eye may take proper tightening exercises and prevent from fatigue of the crystalline lens and ciliary muscle at the same time, which is beneficial to the health of the crystalline lens 208. The introduction of the duration of the condition of the crystalline lens may be combined with any of the embodiments of the present disclosure to form a variation.

Figure 3:
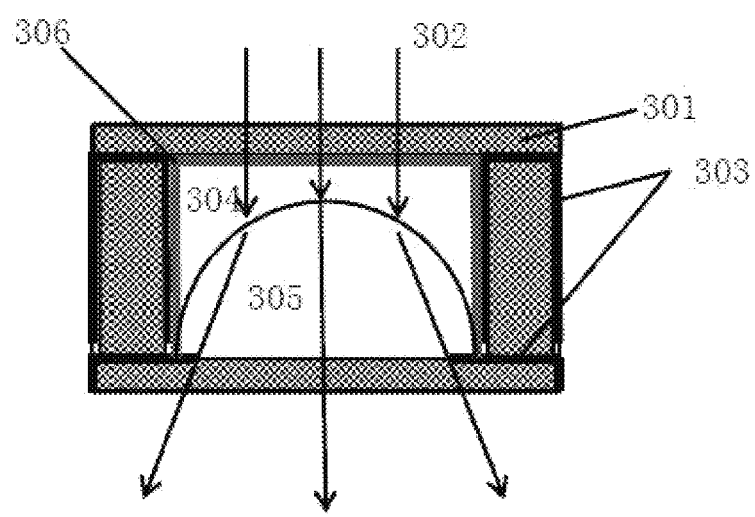
FIG. 3 (*a*) is a cross-sectional view of eyeglass in which an electrowetting dual-liquid zoom lens assembly is a concave lens according to an embodiment of the present disclosure.
Figure 3:
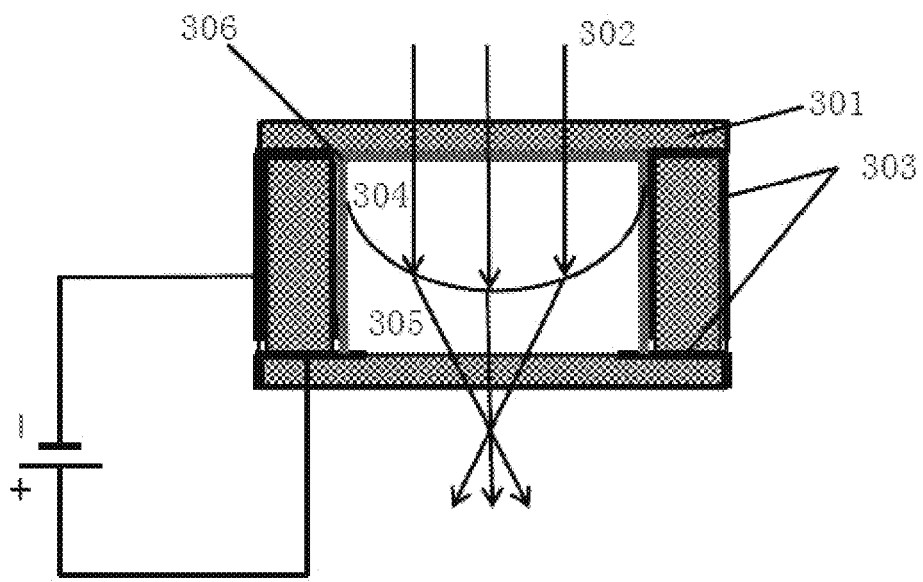

The electrowetting dual-liquid zoom lens assembly 210 shown in FIG. 2 may employ different structures an embodiment of which is illustrated in FIG. 3 (*a*) and FIG. 3 (*b*). As shown in FIG. 3 (a), the electrowetting dual-liquid zoom lens assembly may include an encapsulating member 301, driving electrodes 303, a hydrophobic layer 306, and insulating liquid 304 and conductive liquid 305, and the insulating liquid 304 and conductive liquid 305 are encapsulated between at least part of the encapsulating member 301 and the hydrophobic layer 306. In some embodiments, the encapsulating member 301 may include a base plate, side walls, and a top layer, and may be made of various materials such as glass and resin. The driving electrodes 303 include a negative electrode which is arranged on the side walls and around the hydrophobic layer 306 and is insulated from the hydrophobic layer 306, and a positive electrode electrically connected with a bottom of the conductive liquid 305. In some embodiments, the negative electrode may be made of fine copper wires, and the positive electrode may be made of a transparent ITO coating layer, thereby ensuring light transmittance of the lens assembly.

When no voltage is applied, as shown in FIG. 3 (a), the insulating liquid 304 maintains the inherent polarity thereof. Since surface tension between the insulating liquid 304 and the conductive liquid 305 is relatively small, a contact angle of the conductive liquid 305 with respect to the hydrophobic layer on the sidewall is relatively large, and the electrowetting dual-liquid zoom lens assembly becomes a concave lens to diverge light 302. When a sufficient voltage is applied, as shown in FIG. 3 (b), the polarity of the insulating liquid 305 is changed, the surface tension between the insulating liquid 304 and the conductive liquid 305 is increased, the contact angle of the conductive liquid 305 with respect to the hydrophobic layer on the sidewall is relatively small, and the electrowetting dual-liquid zoom lens assembly becomes a convex lens to converge the light 302. By adjusting the applied voltage, a flat interface may be formed between the insulating liquid 304 and the conductive liquid 305, therefore the electrowetting dual-liquid zoom lens assembly becomes a plane lens.

It should be noted that FIG. 3 (a) and FIG. 3 (b) only illustrate an example of the electrowetting dual-liquid zoom lens assembly, but the electrowetting dual-liquid zoom lens assembly is not limited in the embodiment, and the electrowetting dual-liquid zoom lens assemblies in various structures may be applied to the eyeglass of the present disclosure, and are not described herein. In some embodiments, the electrowetting dual-liquid zoom lens assembly may adopt an array arrangement of electrowetting dual-liquid zoom lens units (not shown). Specifically, a grid array of accommodation units may be formed on a substrate, each accommodation unit is configured to accommodate the conductive liquid and the insulating liquid. The electrowetting dual-liquid zoom lens assembly further includes a top layer for covering and encapsulating the conductive liquid and the insulating liquid in all the accommodation units. For example, the electrowetting dual-liquid zoom lens assembly shown in FIG. 3 (a) and FIG. 3 (b) may serve as the electrowetting dual-liquid zoom lens unit after being reduced in size. The array arrangement facilitates use of miniature electrowetting dual-liquid zoom lens units, the smaller the size is, the more sensitive the surface tension between the conductive liquid and the insulating liquid and the contact angle are fora same change of the voltage, the faster the response speed is, the better the stability and the smoothness of the interface are, the lower the driving voltage required is, so that the eyeglass may adjust the incident light into the eye to parallel light in response to a condition of the crystalline lens in a quicker and effective way with lower power consumption. In an electrowetting dual-liquid zoom lens unit, a hydrophobic layer may be arranged on both sides and the top of a double-layer liquid (i.e., the insulating liquid 304 and the conductive liquid 305) as shown in FIG. 3 (a) and FIG. 3 (b), and also may be arranged on both sides of the double-layer liquid only, or around the double-layer liquid, etc., so as to increase the contact angle of the insulating liquid 304.

The crystalline lens condition acquisition member 202 in various embodiments of the present disclosure may be implemented in various ways.

Figure 4:
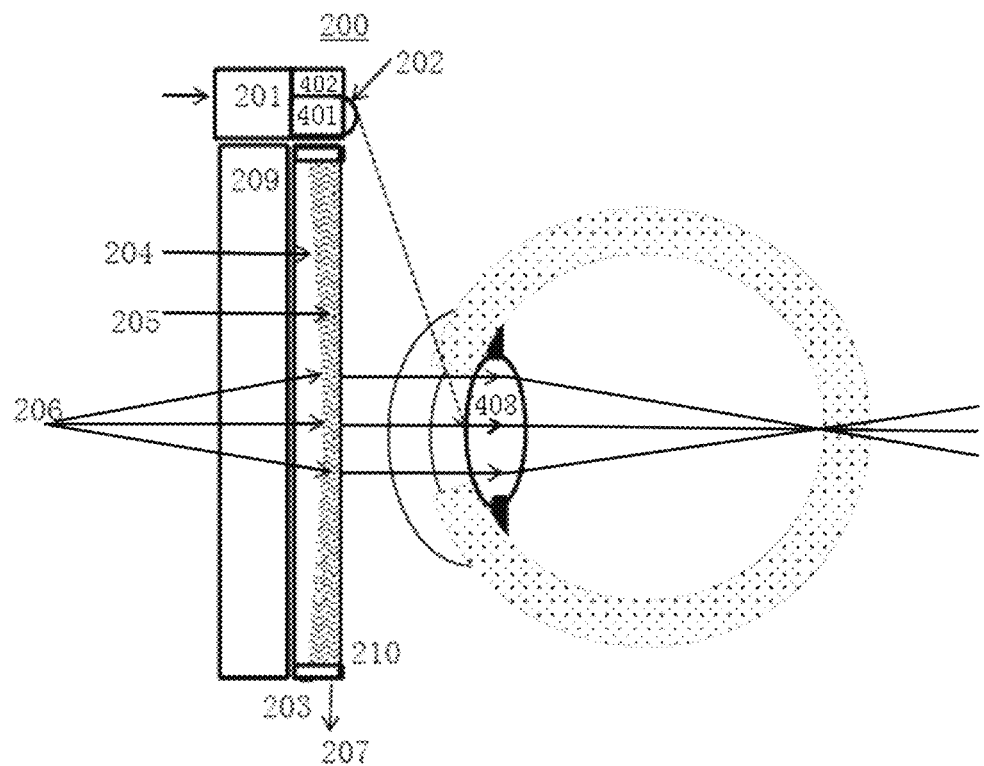
FIG. 4 is a schematic diagram of an example of a method for acquiring a condition of a crystalline lens of the eye according to an embodiment of the present disclosure.

In some embodiments, as shown in FIG. 4, the crystalline lens condition acquisition member 202 may be implemented with a camera including a light emitter 401 and an image sensor 402. The light emitter 401 is configured to emit a light beam to a user's eye, and the image sensor 402 is configured to acquire an image formed by a light beam returned from crystalline lens 408 of the user's eye; and the driving chip described above may be configured to receive the image formed by the light beam from the image sensor 402, calculate a diopter of the crystalline lens 408 according to the image formed by the light beam, and adjust the voltage of the driving electrodes according to the diopter of the crystalline lens 408. In a case where a light beam with the same intensity and shape is emitted to the same user, when the crystalline lens 408 of the user's eye adopts different diopters, light paths along which a light beam is returned from the crystalline lens 408 are different, positions of clear imaging points on an optical axis are different, and imaging positions corresponding to the light beam in an image acquired at a certain position on the optical axis are also different. For example, as shown in FIG. 4, the image sensor 402 may acquire an image formed by a light beam returned from the crystalline lens 408 of the user's eye, and the driving chip may calculate a current position of the light beam, which is returned from the crystalline lens 408 with a current diopter, on the image, and a difference between the current position and a reference position of a corresponding light beam, which is returned from a relaxed crystalline lens 408 of the same user, on the image, and the driving chip further calculate the diopter of the crystalline lens 408 based on the difference. In some embodiments, as an example, the same user may be tested in advance by using a light beam with the same intensity and shape to establish a correspondence table between different diopters of the crystalline lens 408 and corresponding differences. The driving chip may search the correspondence table for a current diopter of the crystalline lens 408 based on a current difference in an actual measurement process. As another example, the image sensor 402 may acquire images, at different image distances, each formed by a series of light beams which are returned from the crystalline lens 408 of the user's eye, so as to obtain a position of the current imaging point (e.g., an image distance), at which the image has the highest resolution, on the optical axis, and the driving chip may calculate the position of the current imaging point of the light beam which is returned from the crystalline lens 408 with a current diopter, and a difference between the position of the current imaging point and a position of reference imaging point, at which the image has the highest resolution, of a corresponding light beam which is returned from a relaxed crystalline lens 408 of the same user, and further calculate the diopter of the crystalline lens 408 based on the difference. The diopter may be calculated in various ways based on the difference of the positions of imaging points, for example, a correspondence table between the diopters and the differences may be established in advance and the diopter is calculated by searching the correspondence table during a measurement process.

In some embodiments, when a user is wearing the eyeglass, the light emitter 401 and the image sensor 402 may be disposed on a side the eyeglass 200 proximal to/facing the eye of the user who is wearing the eyeglass. In this way, the light emitted from the light emitter 401 may readily enter into eye without being blocked, thereby reducing attenuation of incident light and improving resolution of sensing images.

In some embodiments, the light emitter 401 is an infrared emitter, and the crystalline lens condition acquisition member 202 further includes an infrared filter 403 disposed on a light incoming side of the image sensor 402. Infrared rays, especially near infrared rays, have relatively high transmittance in comparison with visible light, and may produce a relatively obvious displacement (e.g., the difference between the current position and the reference position described above) with the same change of a refractive index, and moreover, the infrared rays cannot be seen by human eyes, so that the interference in ambient visible light and the interference due to the ambient visible light can be avoided. The infrared filter 403 on the light incoming side may further filter out stray light in other spectral ranges, so that an infrared image with a higher signal-to-noise ratio may be acquired, thereby improving calculation accuracy of a diopter of the crystalline lens.

In some embodiments, the crystalline lens condition acquisition member 202 may include a distance sensor configured to measure a distance between the eyeglass and a target object; and the driving device 201 may include a driving chip configured to adjust the voltage of the driving electrodes 207 according to the measured distance to convert the light transmitted through the eyeglass 200 to parallel light. For example, when the measured distance is less than a threshold, it may be determined that the crystalline lens 208 of the eye may tighten spontaneously as a response, in this case the voltage of the driving electrodes 207 may be adjusted to convert the light transmitted through the eyeglass 200 to parallel light, thereby relaxing the tense crystalline lens 208 and ciliary muscle. As another example, when the measured distance is greater than a distance threshold, it may be determined that the crystalline lens 208 of the eye may not tighten spontaneously, in this case no voltage is applied to the driving electrodes. For example, the distance sensor may be any one of an infrared distance sensor, an ultrasonic distance sensor, and the like.

In some embodiments, in the eyeglass 200 shown in FIG. 2, a step of adjusting the voltage of the driving electrodes 207 according to the diopter of the crystalline lens 208 includes: adjusting the voltage of the driving electrodes 207 in response to that the diopter of the crystalline lens 208 is greater than a first threshold, so as to turn the electrowetting dual-liquid zoom lens assembly 210 into a convex lens. By setting a first threshold for an individual user, whether the crystalline lens 208 is in a tense state for viewing a nearby object may be accurately and purposefully determined. Correspondingly, the electrowetting dual-liquid zoom lens assembly 210 may become a convex lens by adjusting the voltage of the driving electrodes 207, so as to properly converge the curved light reflected or emitted from the nearby object to parallel light which then enters into eye, thereby relaxing the tense crystalline lens 208 and ciliary muscle.

In some embodiments, the crystalline lens condition acquisition member 202 is configured to continuously acquire the conditions of the crystalline lens 208 of the user who wears the eyeglass 200, and stop adjusting the voltage of the driving electrodes 207 in response to that a fluctuation in the diopter of the crystalline lens 208 is less than a second threshold. Concavity/convexity of the electrowetting dual-liquid zoom lens assembly 210 is gradually adjusted by continuously adjusting the voltage of the driving electrodes 207 at small increments, and the conditions of the crystalline lens 208 are continuously monitored by the crystalline lens condition acquisition member 202 (e.g., an infrared camera including an infrared emitter, an infrared filter and an image sensor), until the fluctuation in the diopter of the crystalline lens 208 is small, at this time the ciliary muscle is relaxed most and does not press the crystalline lens 208 any longer. As a result, the concavity/convexity of the zoom lens assembly 210 is suitable and not excessive, and myopia is effectively prevented with reduced power consumption.

Figure 5:
FIG. 5 is a flowchart illustrating a method for adjusting incident light into an eye according to an embodiment of the present disclosure.

FIG. 5 is a flowchart 500 illustrating a method for adjusting incident light into eyes according to an embodiment of the present disclosure. As shown in FIG. 5, the method includes the following steps: acquiring a condition of a crystalline lens of the eye (step 501); and converting incident light into the eye to parallel light by an electrowetting dual-liquid zoom lens assembly in the case where the crystalline lens is in a tightened condition (step 502). The electrowetting dual-liquid zoom lens assembly may be implemented in any one of examples described in the various embodiments of the present disclosure, and may include insulating liquid, conductive liquid and driving electrodes. The insulating liquid and conductive liquid are encapsulated, and the driving electrodes are configured to apply a voltage to the insulating liquid and the conductive liquid, which are not described in detail here.

In some embodiments, the method further includes: determining a duration of an acquired condition of the crystalline lens; and converting the incident light into the eye to parallel light by the electrowetting dual-liquid zoom lens assembly in the case where the crystalline lens is in a tightened condition and the duration of the tightened condition exceeds a third threshold. When the duration of the tightened condition of the crystalline lens exceeds the third threshold, it may be determined that the crystalline lens and the ciliary muscle of the eye are already tired. The voltage of the driving electrodes is adjusted to convert the incident light into the eye to parallel light, so as to relax the tense crystalline lens and ciliary muscle. When the duration of the tightened condition of the crystalline lens does not exceed the threshold, it may be determined that the crystalline lens is tightened within a suitable application range and thus does not need relax, so that the crystalline lens and the ciliary muscle of the user's eye may take proper tightening exercises and prevent from fatigue of the crystalline lens and ciliary muscle at the same time, which is beneficial to the health of the eye.

In some embodiments, the step 501 of acquiring the condition of the crystalline lens of the eye includes: emitting a light beam to the user's eye, and acquiring an image formed by a light beam returned from the crystalline lens of the user's eye.

The step 502 of converting the incident light into the eye to parallel light by the electrowetting dual-liquid zoom lens assembly in the case where the crystalline lens is in a tightened condition may include: calculating a diopter of the crystalline lens according to the image formed the light beam, and adjusting the voltage of the driving electrodes in response to that the diopter of the crystalline lens is greater than a first threshold, so as to turn the electrowetting dual-liquid zoom lens assembly into a convex lens. A first threshold may be set for an individual user, so that it can be determined accurately and purposefully that whether the crystalline lens is in a tightened condition for viewing a nearby object. Accordingly, the voltage of the driving electrodes may be adjusted to turn the electrowetting dual-liquid zoom lens assembly into a convex lens, so as to properly converge the curved light reflected by or emitted from the nearby object to parallel light which then enters the eye, thereby relaxing the tense crystalline lens and ciliary muscle.

In some embodiments, the step 501 of acquiring the condition of the crystalline lens of the eye may be performed continuously. The adjustment of the voltage of the driving electrodes stops in response to that a fluctuation in a diopter of the crystalline lens is less than a second threshold. Concavity/convexity of the electrowetting dual-liquid zoom lens assembly is gradually adjusted by continuously adjusting the voltage of the driving electrodes with small increments, and the conditions of the crystalline lens are continuously monitored by the crystalline lens condition acquisition member (e.g., an infrared camera including an infrared emitter, an infrared filter and an image sensor), until the fluctuation in the diopter of the crystalline lens is small, at this time the ciliary muscle is relaxed most and does not press the crystalline lens any longer. As a result, the concavity/convexity of the zoom lens assembly is suitable and not excessive, and myopia is effectively prevented with reduced power consumption.

In some embodiments, the step 502 of acquiring the condition of the crystalline lens of the eye is realized by measuring a distance between the eye and a target object. For example, when the measured distance is less than a threshold, it may be determined that the crystalline lens of the eye may tighten spontaneously as a response, in this case the voltage of the driving electrodes may be adjusted to convert the incident light into the eye to parallel light, thereby relaxing the tense crystalline lens and ciliary muscle. In the case where the measured distance is greater than a distance threshold, it may be determined that the crystalline lens of the eye may not tighten spontaneously as a response but relax, in this case no voltage is applied to the driving electrodes. The condition of the crystalline lens of the eye may be easily determined by measuring the distance between the eye and the target object, and it is unnecessary to introduce post-processing for calculating the diopter of the crystalline lens, thereby simplifying implementation, reducing cost and facilitating popularization.

To keep the following description of the embodiments of the present disclosure clear and concise, detailed descriptions of known functions and known components are omitted from the present disclosure.

The above embodiments are merely exemplary embodiments of the present disclosure, and are not intended to limit the present disclosure, and the scope of the present disclosure is defined by the claims. Various modifications and equivalents of the present disclosure may be made by those skilled in the art within the essence and scope of the present disclosure, and should be considered to fall within the scope of the present disclosure.

What is claimed is:

1. An eyeglass, comprising:
   a crystalline lens condition acquisition member configured to acquire a condition of a crystalline lens of an eye of a user who wears the eyeglass;
   a lens of eyeglass comprising an electrowetting dual-liquid zoom lens assembly, the electrowetting dual-liquid zoom lens assembly comprising insulating liquid, conductive liquid and driving electrodes, with the insulating liquid and conductive liquid being encapsulated, and the driving electrodes being configured to apply a voltage to the insulating liquid and the conductive liquid; and
   a driving device coupled to the crystalline lens condition acquisition member and the driving electrodes, and configured to adjust the voltage applied by the driving electrodes in response to that the crystalline lens is in a tightened condition so as to convert light transmitted through the eyeglass to parallel light,
   wherein the electrowetting dual-liquid zoom lens assembly further comprises:
   a substrate on which a grid array of accommodation units is locate, each of the accommodation units being configured to accommodate the conductive liquid and the insulating liquid therein, and
   a top layer configured to cover and encapsulate the conductive liquid and the insulating liquid in all of the accommodation units.

2. The eyeglass of claim 1, wherein the driving device is configured to determine a duration of an acquired condition of the crystalline lens, and adjust the voltage of the driving electrodes according to both the acquired condition of the crystalline lens and the duration of the acquired condition.

3. The eyeglass of claim 1, wherein the crystalline lens condition acquisition member comprises a light emitter configured to emit a light beam to the crystalline lens of the eye of the user who wears the eyeglass, and an image sensor configured to acquire an image formed by a light beam returned from the crystalline lens of the eye of the user, and
   the driving device comprises a driving chip configured to receive the image formed by the image sensor, calculate a diopter of the crystalline lens according to the image, and adjust the voltage of the driving electrodes according to the diopter of the crystalline lens.

4. The eyeglass of claim 3, wherein adjusting the voltage of the driving electrodes according to the diopter of the crystalline lens comprises: adjusting the voltage of the driving electrodes in response to that the diopter of the crystalline lens is greater than a first threshold, so as to turn the electrowetting dual-liquid zoom lens assembly into a convex lens.

5. The eyeglass of claim 4, wherein
   the crystalline lens condition acquisition member is configured to continuously acquire the condition of the crystalline lens of the eye of the user who wears the eyeglass, and
   adjusting the voltage of the driving electrodes according to the diopter of the crystalline lens further comprises: stopping adjusting the voltage of the driving electrodes in response to that a fluctuation in the diopter of the crystalline lens is less than a second threshold.

6. The eyeglass of claim 3, wherein the light emitter and the image sensor are on a side of the eyeglass proximal to the eye.

7. The eyeglass of claim 6, wherein
   the light emitter is an infrared emitter, and
   the crystalline lens condition acquisition member further comprises an infrared filter on a light incoming side of the image sensor.

8. The eyeglass of claim 1, wherein
   the crystalline lens condition acquisition member comprises a distance sensor configured to measure a distance between the eyeglass and a target object, and the driving device comprises a driving chip configured to adjust the voltage of the driving electrodes according to a measured distance.

9. The eyeglass of claim 8, wherein the driving chip is further configured to apply no voltage to the driving electrodes in response to that the measured distance is greater than a distance threshold.

10. The eyeglass of claim 1, wherein at least inner side walls of each of the accommodation unit are coated with a hydrophobic layer.

11. A method for adjusting incident light into an eye by using the eyeglass of claim 1, comprising:
    acquiring the condition of the crystalline lens of the eye; and
    converting incident light into the crystalline lens of the eye to parallel light by the electrowetting dual-liquid zoom lens assembly in response to that the crystalline lens is in a tightened condition.

12. The method of claim 11, further comprising:
    determining a duration of an acquired condition of the crystalline lens; and
    converting the incident light into the crystalline lens of the eye to parallel light by the electrowetting dual-liquid zoom lens assembly in response to that the crystalline lens is in a tightened condition and the duration of the tightened condition exceeds a third threshold.

13. The method of claim 11, wherein acquiring the condition of the crystalline lens of the eye comprises: emitting a light beam to the crystalline lens of the eye, and acquiring an image formed by a light beam returned from the crystalline lens of the eye; and
    converting the incident light into the crystalline lens of the eye to parallel light by the electrowetting dual-liquid zoom lens assembly in response to that the crystalline lens is in the tightened condition comprises: calculating a diopter of the crystalline lens according to the image, and adjusting the voltage of the driving electrodes in response to that the diopter of the crystalline lens is greater than a first threshold, so as to turn the electrowetting dual-liquid zoom lens assembly into a convex lens.

14. The method of claim 13, wherein the step of acquiring the condition of the crystalline lens of the eye is performed continuously, and adjustment of the voltage of the driving electrodes stops in response to that a fluctuation in the diopter of the crystalline lens is less than a second threshold.

15. The method of claim 11, wherein the condition of the crystalline lens of the eye is acquired by measuring a distance between the eye and a target object.

* * * * *